United States Patent
Tzeng et al.

(10) Patent No.: US 6,929,969 B2
(45) Date of Patent: Aug. 16, 2005

(54) REFLECTIVE SPATIAL LIGHT MODULATOR MIRROR DEVICE MANUFACTURING PROCESS AND LAYOUT METHOD

(75) Inventors: Jiann-Tyng Tzeng, Hsin-Chu (TW); Yuh-Hwa Chang, Taipei (TW)

(73) Assignee: Taiwan Semiconductor Manufacturing Company, Hsin-Chu (TW)

( * ) Notice: Subject to any disclaimer, the term of this patent is extended or adjusted under 35 U.S.C. 154(b) by 149 days.

(21) Appl. No.: 10/421,200

(22) Filed: Apr. 23, 2003

(65) Prior Publication Data

US 2004/0226909 A1 Nov. 18, 2004

(51) Int. Cl.[7] ............................................... H01L 21/00
(52) U.S. Cl. ....................................................... 438/52
(58) Field of Search ............................. 438/52, 69, 72

(56) References Cited

U.S. PATENT DOCUMENTS

| | | | |
|---|---|---|---|
| 6,046,840 A | | 4/2000 | Huibers ....................... 359/291 |
| 6,275,325 B1 | | 8/2001 | Sinclair ....................... 359/291 |
| 6,300,156 B1 | * | 10/2001 | Decker et al. ................. 438/52 |
| 6,329,738 B1 | | 12/2001 | Hung et al. .................. 310/309 |
| 6,337,760 B1 | | 1/2002 | Huibers et al. .............. 359/291 |
| 6,356,378 B1 | | 3/2002 | Huibers ....................... 359/291 |
| 6,396,619 B1 | | 5/2002 | Huibers et al. .............. 359/291 |
| 6,408,878 B2 | | 6/2002 | Unger et al. ................. 137/597 |
| 6,529,310 B1 | * | 3/2003 | Huibers et al. .............. 359/291 |
| 6,804,039 B1 | * | 10/2004 | Doan et al. .................. 359/291 |
| 2002/0196524 A1 | * | 12/2002 | Huibers et al. .............. 359/291 |
| 2003/0134449 A1 | * | 7/2003 | Huibers ....................... 438/52 |
| 2004/0156089 A1 | * | 8/2004 | Doan et al. .................. 359/291 |

\* cited by examiner

Primary Examiner—Olik Chaudhuri
Assistant Examiner—Lex H. Malsawma

(57) ABSTRACT

A method of fabricating a double substrate spatial light modulator wherein the mirror sidewall residue problem is eliminated is described. A first sacrificial layer is formed overlying a glass substrate. A metal layer is deposited overlying the first sacrificial layer. First openings are formed in the metal layer. A second sacrificial layer is formed overlying the metal layer and within the first openings. The second sacrificial layer is patterned to form hinge openings to the metal layer and the second and first sacrificial layers are patterned to form post openings to the substrate within the first openings. Support posts are formed within the post openings and hinges are formed within the hinge openings wherein each of the hinges is connected to the support posts on either side of the hinge openings. Thereafter, the metal layer is patterned to form a plurality of micromirrors wherein each of the plurality of micromirrors is attached on one end to one of the hinges through the hinge openings. The first and second sacrificial layers are removed to complete fabrication of the micromirrors.

19 Claims, 7 Drawing Sheets

REFLECTIVE SPATIAL LIGHT MODULATOR MIRROR DEVICE MANUFACTURING PROCESS AND LAYOUT METHOD

RELATED PATENT APPLICATION

U.S. patent application Ser. No. 10/420,285, filed on Apr. 4, 2003.

BACKGROUND OF THE INVENTION (1) Field of the Invention

The present invention relates to the fabrication of micro electro-mechanical devices, and more particularly, to a method of eliminating nitride residue between mirrors for a reflective spatial light modulator in the fabrication of micro electro-mechanical devices.

(2) Description of the Prior Art

A double substrate spatial light modulator includes mirrors suspended by hinges from an upper substrate. Individual mirrors can be selectively deflected to spatially modulate light incident to the upper substrate and then to reflect the light back to the upper substrate. The mirror twist angle can be controlled by changing the input voltage of the high voltage (HV) devices. The mirror twist angle effects the light reflection path. Therefore, different reflection paths can be treated as On/Off states.

FIG. 1 illustrates a double substrate spatial light modulator. Micromirrors 16 are attached to a glass substrate 10 by hinges 20. Electrodes 44 on a CMOS substrate 40 control the deflection of the mirrors. CMOS HV devices are formed within the substrate 40. Light is reflected as shown by 45 and 47. Mirrors 16 are illustrated in another view in FIG. 2. In making the mirrors, silicon nitride residue can prevent free movement of the mirrors. It is desired to provide a process for fabricating micromirrors wherein the silicon nitride residue problem is eliminated.

U.S. Pat. No. 6,337,760 to Huibers et al, U.S. Pat. No. 6,046,840 to Huibers, U.S. Pat. No. 6,356,378 to Huibers, U.S. Pat. No. 6,275,325 B1 to Sinclair, and U.S. Pat. No. 6,396,619 B1 to Huibers et al show mirrors with different types of hinges. U.S. Pat. No. 6,329,738 B1 to Hung et al shows a mirror with no hinge.

SUMMARY OF THE INVENTION

Accordingly, it is a primary object of the invention to provide a method for fabricating a double substrate spatial light modulator.

Another object of the invention is to provide a method for fabricating a double substrate spatial light modulator wherein the mirror sidewall residue problem is eliminated.

In accordance with the objects of the invention, a method of fabricating a double substrate spatial light modulator wherein the mirror sidewall residue problem is eliminated is achieved. A first sacrificial layer is formed overlying a glass substrate. A mirror layer is deposited overlying the first sacrificial layer. The mirror layer is patterned to form first openings in the mirror layer. A second sacrificial layer is formed overlying the mirror layer and within the first openings. The second sacrificial layer is patterned to form hinge openings to the mirror layer and the second and first sacrificial layers are patterned to form post openings to the substrate within the first openings. A silicon nitride layer is deposited overlying the second sacrificial layer and lining the post openings and hinge openings. The silicon nitride layer is etched back to leave the silicon nitride only on sidewalls of the post openings and hinge openings wherein the silicon nitride within the post openings forms support posts. A hinge layer is deposited overlying the second sacrificial layer and within the post openings and hinge openings and patterned to form hinges wherein each of the hinges is connected to the support posts on either side of the hinge openings. Thereafter, the mirror layer is patterned to form a plurality of micromirrors wherein each of the plurality of micromirrors is attached on one end to one of the hinges through the hinge openings. The first and second sacrificial layers are removed to complete fabrication of the micromirrors.

BRIEF DESCRIPTION OF THE DRAWINGS

In the accompanying drawings forming a material part of this description, there is shown.

DESCRIPTION OF THE PREFERRED EMBODIMENTS

The process of the present invention provides a method to fabricate reflective spatial light modulator mirror devices without mirror sidewall residue problems. This method is achieved by modifying the manufacturing process and layout method.

Figure 1:
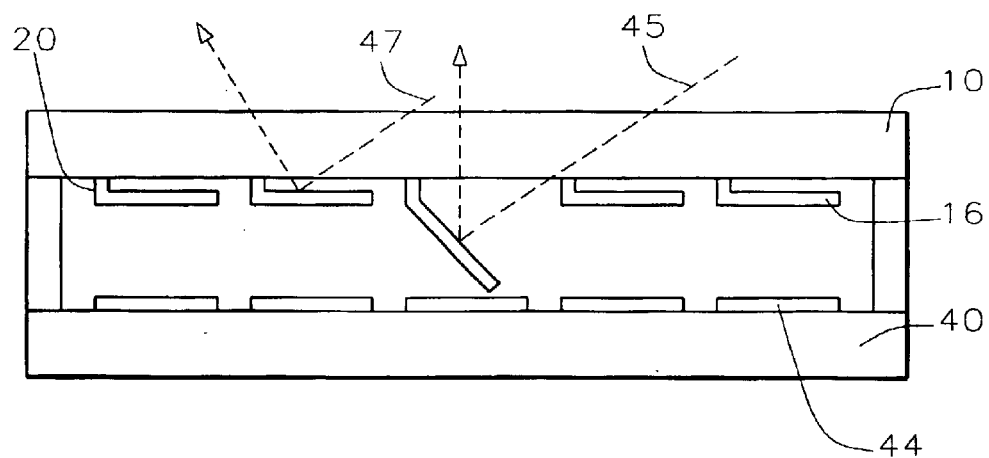
FIG. 1 is a cross-sectional representation of a double substrate spatial light modulator.
Figure 2:
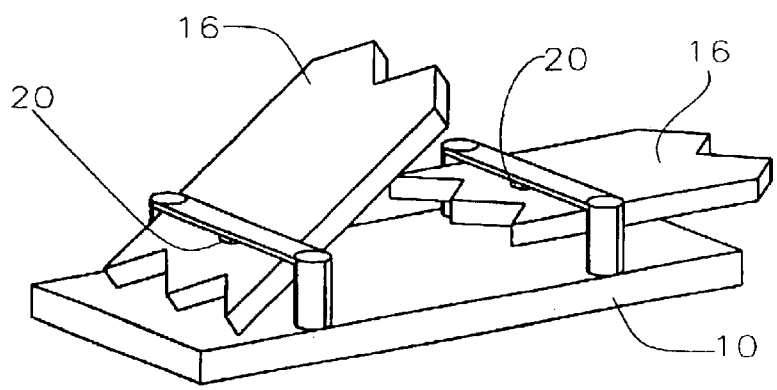
FIG. 2 is an enlarged view of micromirrors of the present invention.
Figure 3:
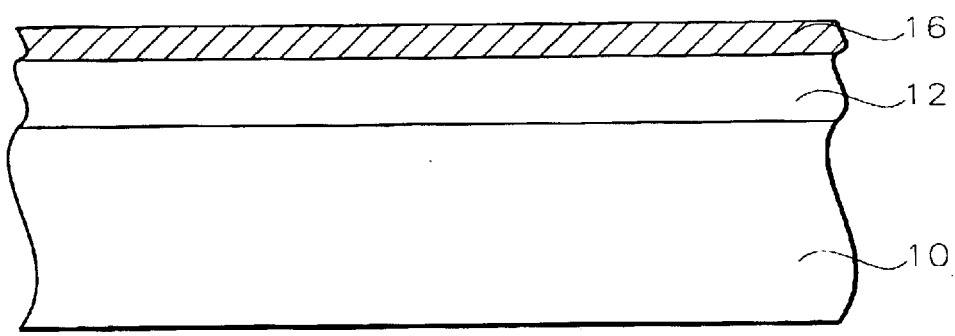
FIGS. 3, 4, 6, 7, 9, 10, 12, and 13 are cross-sectional representations of a preferred embodiment of the present invention.

The process of the present invention begins with a glass substrate 10 illustrated in FIG. 3. Preferably, the glass substrate will have an opaque backside. Now, a first sacrificial layer 12 is deposited over the surface of the glass substrate. Preferably, the sacrificial layer comprises amorphous silicon having a thickness of about 10,000 Angstroms. Now the mirror layer 16 is deposited to a thickness of about 3000 Angstroms. Preferably, the mirror layer will comprise a highly reflective material, for example, aluminum.

Figure 4:
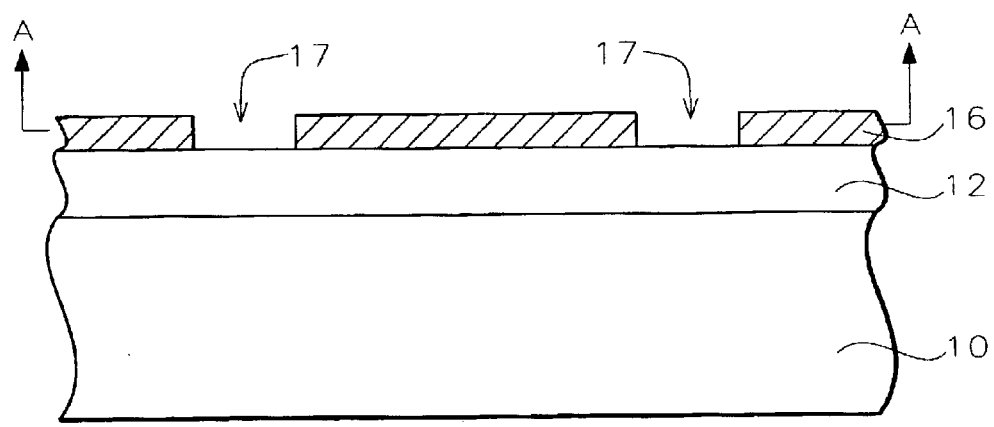
Figure 5A:
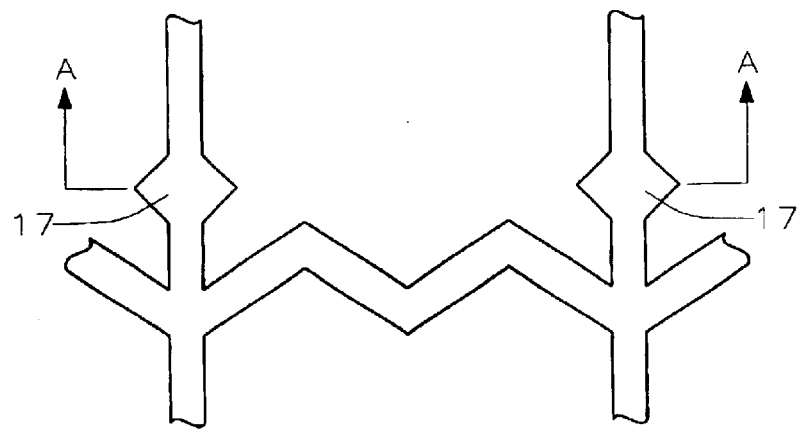
FIG. 5A is a top view of the mirror pattern of the prior art.
Figure 5B:
FIG. 5B is a top view of the first mirror pattern of the present invention.

Referring now to FIG. 4, the mirror layer 16 is patterned as shown to provide post openings 17. FIG. 5A illustrates a top view of the mirror pattern, or opening layout, of the prior art. FIG. 5B shows the new opening layout of the present invention. In the present invention, the patterning of the mirror is done in two steps. In the first mirror pattern shown in FIG. 5B, openings are made only at the post locations. FIG. 4 shows the cross-section view A—A of FIG. 5B.

Figure 6:
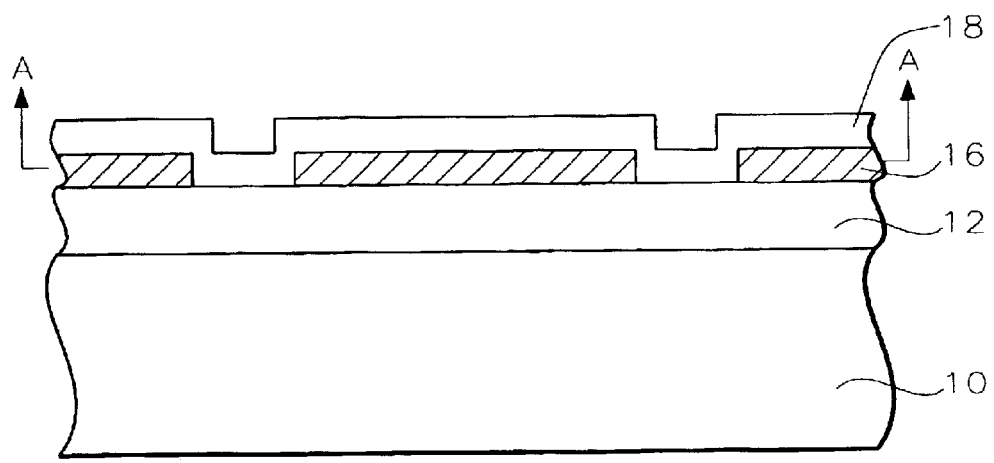

Now, a second sacrificial layer 18 is deposited over the patterned metal layer, as shown in FIG. 6. Preferably, the sacrificial layer comprises amorphous silicon having a thickness of about 10,000 Angstroms.

Figure 7:
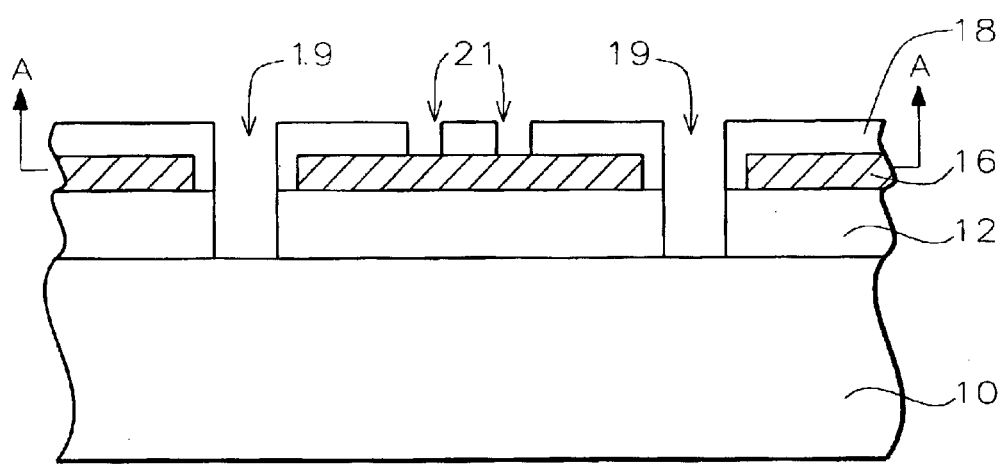
Figure 8:
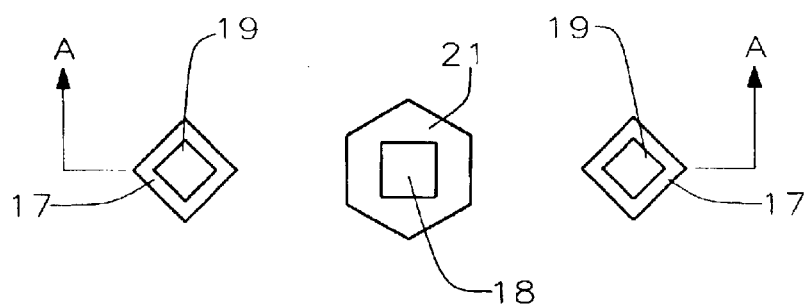
FIG. 8 is a top view of the via pattern of the present invention.

Referring now to FIG. 7, deep vias 19 are etched within the openings 17 and all the way through the first sacrificial layer 12 to the substrate. Shallow vias 21 are etched through the second sacrificial layer 18 to the metal layer 16 in the area between the two deep vias. FIG. 8 illustrates the top view of the opening pattern of cross-section A—A.

Figure 9:
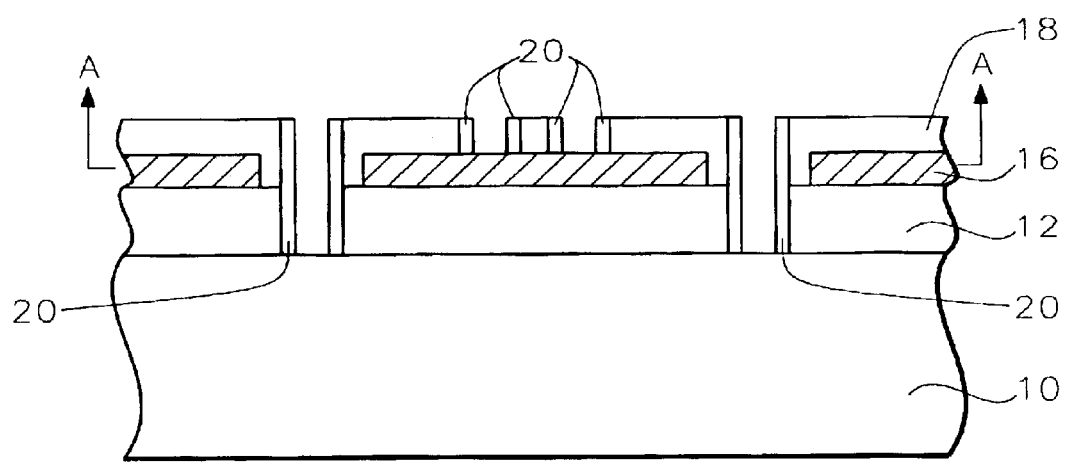

Now a layer of silicon nitride is deposited over the substrate and within the vias to a thickness of about 4000 Angstroms. The silicon nitride layer is etched back to leave the silicon nitride 20 on the sidewalls of the vias as shown in FIG. 9. The silicon nitride 20 forms the support posts having good mechanical strength within the deep vias.

Figure 10:
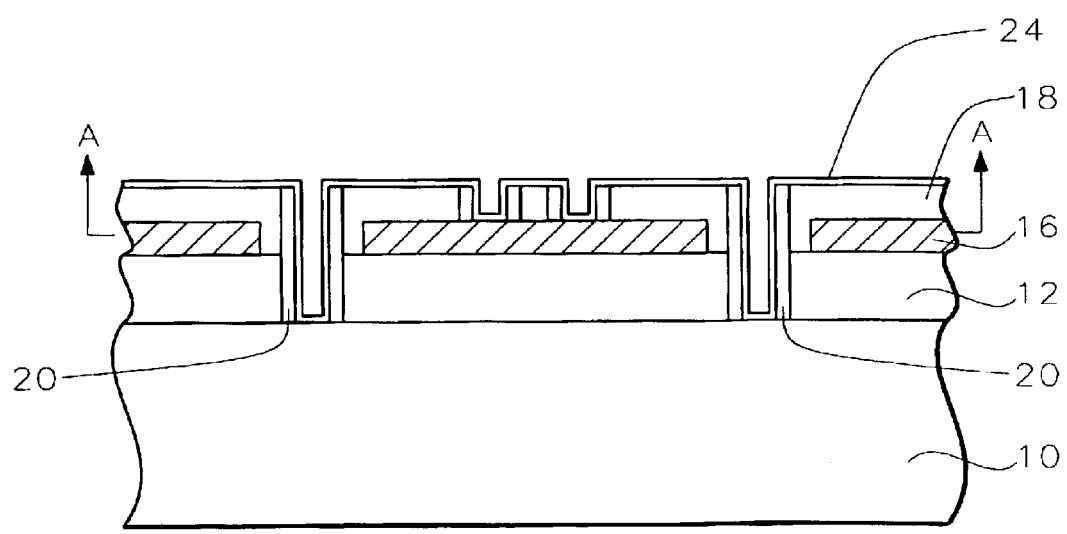

As illustrated in FIG. 10, a layer 24 is deposited over the sacrificial layer 18 and the silicon nitride sidewalls 20. The layer 24 preferably comprises titanium/silicon nitride/titanium having a thickness of about 600 Angstroms. The layer 24 is patterned to form the hinge 24 within the mirror spacing as shown in FIG. 10.

Figure 11:
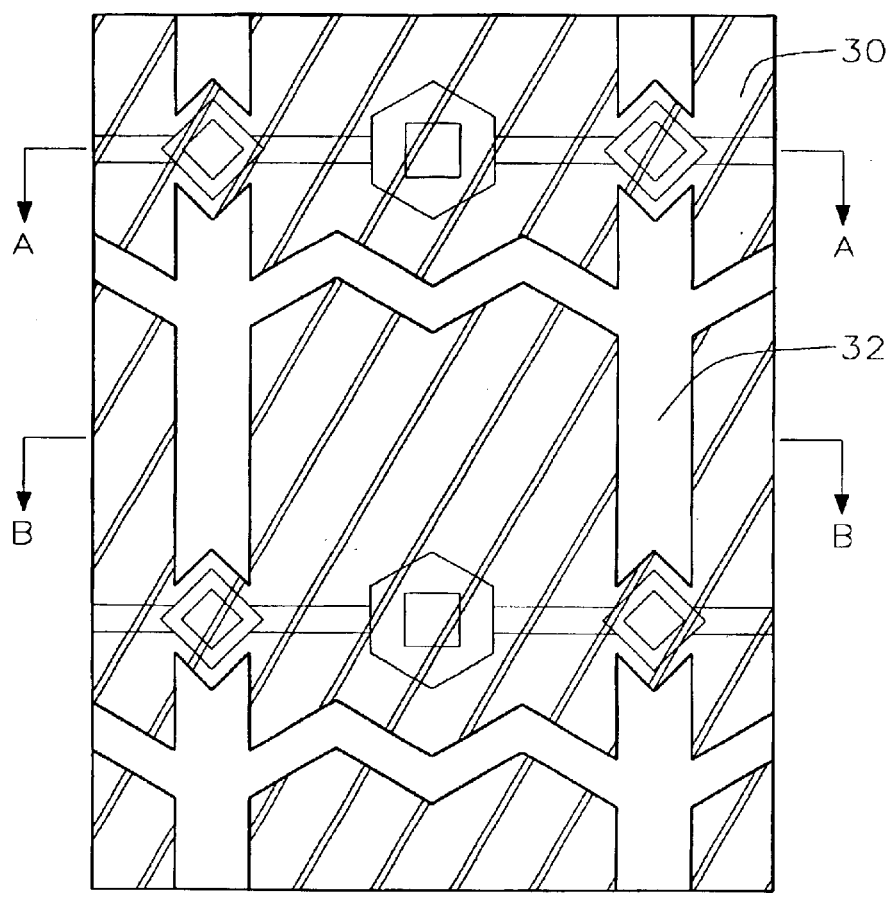
FIG. 11 is a top view of the second mirror pattern of the present invention.
Figure 12:
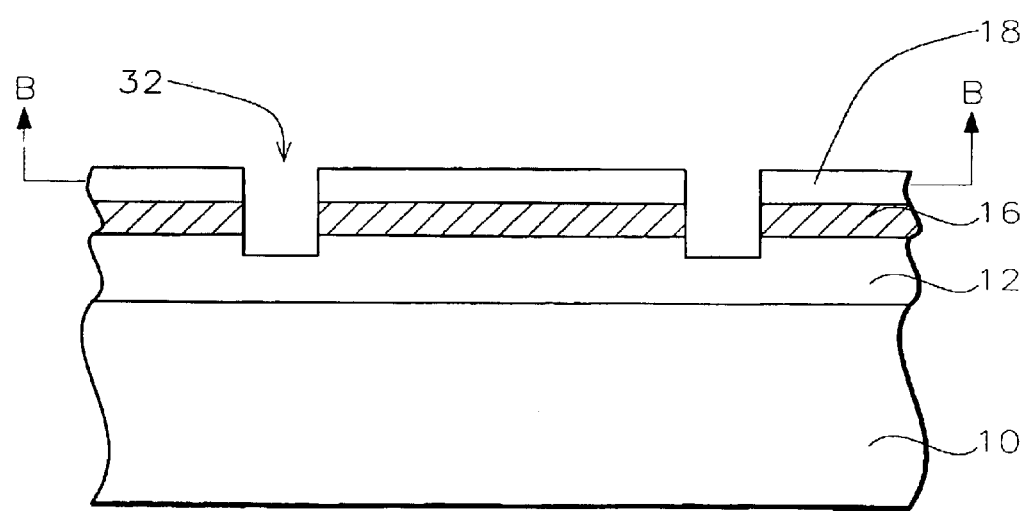

Now, the patterning of the mirrors is completed. FIG. 11 illustrates the second mask 30 for the mirror patterning. FIG. 12 shows view B—B of the top view in FIG. 11. Using the mask shown in FIG. 11, the second sacrificial layer 18 and the metal layer 16 are etched at one time, stopping at the first sacrificial layer 12. The mask protects the hinge material within the mirror spacing during this etching. In the prior art, this mirror pattern was used during the first mirror etching to form the posts. Because of this, silicon nitride was deposited within these openings 32 between mirrors. The silicon nitride etchback step left silicon nitride residue within the openings; that is, at the sidewall edges of the mirrors. The residue at the sidewall edges of the mirrors will effect the release process wherein the sacrificial layers are removed by a dry etch process. The residue will prevent a clean release. Also, the completed mirrors will not move freely because of the residue.

In the process of the present invention, the silicon nitride is deposited only within the post hole and hinge openings to form the posts. The mirrors are separated after the posts and hinges have been completed. Thus, no residue material is left within the openings. The sidewalls of the mirrors are clear.

Figure 13:
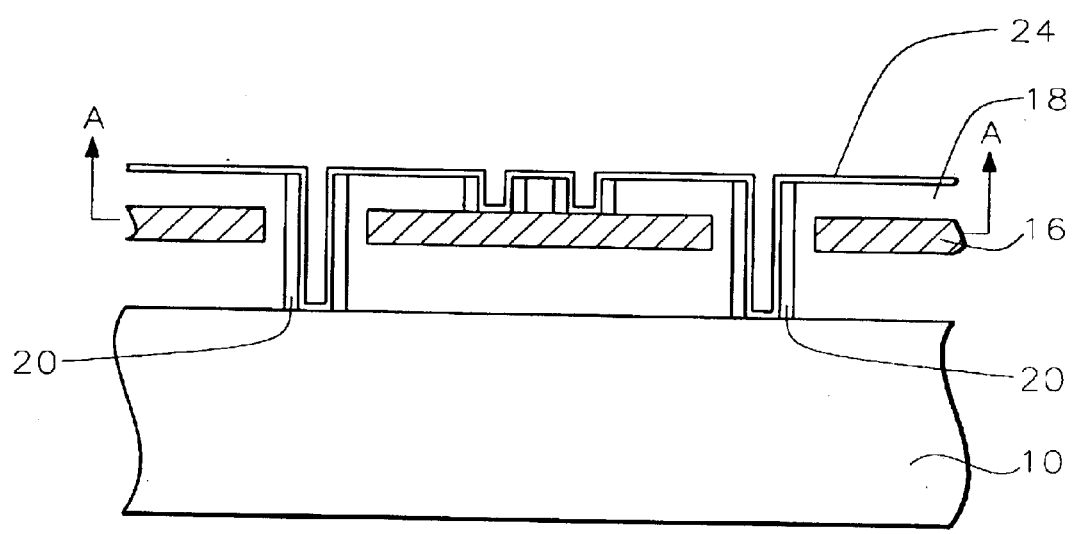

Now, the first and second sacrificial layers are removed by dry etching. In the process of the present invention, no residue lies on the mirror edges to effect the release process. The completed mirrors are shown in view A—A in FIG. 13. Hinge 24 is attached to mirror 16 and supported by posts 20.

The process of the present invention provides a method and layout for fabricating micromirrors in the fabrication of a reflective spatial light modulator. The new method and layout pattern eliminate the problem of residue at the mirror edges, thus allowing clean formation and free movement of the mirrors.

While the invention has been particularly shown and described with reference to the preferred embodiments thereof, it will be understood by those skilled in the art that various changes in form and details may be made without departing from the spirit and scope of the invention.

What is claimed is:

1. A method of fabricating micromirrors comprising:
   forming a first sacrificial layer overlying a substrate;
   depositing a mirror layer overlying said first sacrificial layer;
   patterning said mirror layer to form first openings in said mirror layer, at least one of said first openings surrounded by said mirror layer;
   forming a second sacrificial layer overlying said mirror layer and within said first openings;
   a patterning said second sacrificial layer to form hinge openings to said mirror layer and patterning said second and first sacrificial layers to form post openings within said first openings;
   forming support posts within said post openings and hinges within said hinge openings wherein each of said hinges is connected to said support posts;
   thereafter patterning said mirror layer to form a plurality of said micromirrors wherein each of said plurality of micromirrors is attached on one end to one of said hinges through said hinge openings; and
   removing said first and second sacrificial layers to complete fabrication of said micromirrors.

2. The method according to claim 1 wherein said substrate comprises glass.

3. The method according to claim 1 wherein said first sacrificial layer comprises amorphous silicon and has a thickness of about 10,000 Angstroms.

4. The method according to claim 1 wherein said mirror layer comprises aluminum and has a thickness of about 3000 Angstroms.

5. The method according to claim 1 wherein said second sacrificial layer comprises amorphous silicon and has a thickness of about 10,000 Angstroms.

6. The method according to claim 1 wherein said support posts comprise silicon nitride having a thickness of about 4000 Angstroms.

7. The method according to claim 1 wherein said hinges comprise titanium/silicon/nitride/titanium having a thickness of about 600 Angstroms.

8. A method of fabricating micromirrors comprising:
   forming a first sacrificial layer overlying a glass substrate;
   depositing a metal layer overlying said first sacrificial layer;
   patterning said metal layer to form first openings in said metal layer, at least one of said first openings surrounded by said metal layer;
   forming a second sacrificial layer overlying said metal layer and within said first openings;
   patterning said second sacrificial layer to form hinge openings to said metal layer and patterning said second and first sacrificial layers to form post openings within said first openings;
   depositing a post material layer overlying said second sacrificial layer and lining said post openings and hinge openings;
   etching back said post material layer to leave said post material only on sidewalls of said post openings and said hinge openings wherein said post material within said post openings forms support posts;
   depositing a hinge layer overlying said second sacrificial layer and within said post openings and hinge openings and patterning said hinge layer to form hinges wherein each of said hinges is connected to said support posts on either side of said hinge openings;
   thereafter patterning said metal layer to form a plurality of said micromirrors wherein each of said plurality of micromirrors is attached on one end to one of said hinges through said hinge openings; and
   removing said first and second sacrificial layers to complete fabrication of said micromirrors.

9. The method according to claim 8 wherein said first sacrificial layer comprises amorphous silicon and has a thickness of about 10,000 Angstroms.

10. The method according to claim 8 wherein said metal layer comprises aluminum and has a thickness of about 3000 Angstroms.

11. The method according to claim 8 wherein said second sacrificial layer comprises amorphous silicon and has a thickness of about 10,000 Angstroms.

12. The method according to claim 8 wherein said post material layer comprises silicon nitride and has a thickness of about 4000 Angstroms.

13. The method according to claim 8 wherein said hinge layer comprises titanium/silicon nitride/titanium and has a thickness of about 600 Angstroms.

14. A method of fabricating micromirrors comprising:

forming a first sacrificial layer overlying a glass substrate;

depositing a mirror layer overlying said first sacrificial layer;

patterning said mirror layer to form first openings in said mirror layer, at least one of said first openings surrounded by said mirror layer;

forming a second sacrificial layer overlying said mirror layer and within said first openings;

patterning said second sacrificial layer to form hinge openings to said mirror layer and patterning said second and first sacrificial layers to form post openings within said first openings;

depositing a silicon nitride layer overlying said second sacrificial layer and lining said post openings and hinge openings;

etching back said silicon nitride layer to leave said silicon nitride only on sidewalls of said post openings and said hinge openings wherein said silicon nitride within said post openings forms support posts;

depositing a hinge layer overlying said second sacrificial layer and within said post openings and hinge openings and patterning said hinge layer to form hinges wherein each of said hinges is connected to said support posts on either side of said hinge openings;

thereafter patterning said mirror layer to form a plurality of said micromirrors wherein each of said plurality of micromirrors is attached on one end to one of said hinges through said hinge openings; and removing said first and second sacrificial layers to complete fabrication of said micromirrors.

15. The method according to claim 14 wherein said first sacrificial layer comprises amorphous silicon and has a thickness of about 10,000 Angstroms.

16. The method according to claim 14 wherein said mirror layer comprises aluminum and has a thickness of about 3000 Angstroms.

17. The method according to claim 14 wherein said second sacrificial layer comprises amorphous silicon and has a thickness of about 10,000 Angstroms.

18. The method according to claim 14 wherein said silicon nitride layer has a thickness of about 4000 Angstroms.

19. The method according to claim 14 wherein said hinge layer comprises titanium/silicon nitride/titanium and has a thickness of about 600 Angstroms.

* * * * *